(12) United States Patent
Hung et al.

(10) Patent No.: US 8,471,859 B2
(45) Date of Patent: Jun. 25, 2013

(54) DEVICE AND METHOD FOR CONTROLLING FRAME INPUT AND OUTPUT

(75) Inventors: Chia-Lung Hung, HsinChu (TW); Tzuo-Bo Lin, HsinChu (TW); Hsien-Chun Chang, HsinChu (TW); Yu-Pin Chou, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 763 days.

(21) Appl. No.: 12/692,389

(22) Filed: Jan. 22, 2010

(65) Prior Publication Data

US 2010/0188574 A1 Jul. 29, 2010

(30) Foreign Application Priority Data

Jan. 23, 2009 (TW) .............................. 98102941 A

(51) Int. Cl.
*G09G 5/39* (2006.01)
*G09G 5/36* (2006.01)
*G06F 12/02* (2006.01)
*H04N 7/01* (2006.01)

(52) U.S. Cl.
USPC ........... 345/531; 345/543; 345/544; 345/545; 345/547; 348/459

(58) Field of Classification Search
None
See application file for complete search history.

(56) References Cited

U.S. PATENT DOCUMENTS

| | | | |
|---|---|---|---|
| 5,640,209 A | 6/1997 | Lee et al. | |
| 5,767,862 A * | 6/1998 | Krishnamurthy et al. | 345/558 |
| 5,951,635 A | 9/1999 | Kamgar | |
| 6,445,419 B1 | 9/2002 | Sanpei | |
| 6,845,414 B2 | 1/2005 | Hsu et al. | |
| 6,894,706 B1 | 5/2005 | Ward et al. | |
| 7,315,600 B2 | 1/2008 | Sigurdsson et al. | |
| 7,589,736 B1 * | 9/2009 | West | 345/543 |
| 2003/0048275 A1 * | 3/2003 | Ciolac | 345/544 |
| 2003/0164897 A1 * | 9/2003 | Chen et al. | 348/459 |
| 2005/0046637 A1 * | 3/2005 | Mondal | 345/547 |
| 2006/0238541 A1 * | 10/2006 | Toni | 345/531 |
| 2007/0070212 A1 | 3/2007 | Haneda | |
| 2008/0238943 A1 * | 10/2008 | Huang | 345/660 |

* cited by examiner

*Primary Examiner* — Maurice L McDowell, Jr.
*Assistant Examiner* — Donna Ricks
(74) *Attorney, Agent, or Firm* — McClure, Qualey & Rodack, LLP

(57) ABSTRACT

A device and method for controlling frame input and output are applied to the reception of image data from a source device and output of the image data to a destination device, the device includes a buffer, a buffer control circuit, and a frame write controller. The input pixel clock is not equal to the output pixel clock. The frame write controller generates a write permission signal according to the Input DE and the Output DE. The buffer control circuit generates a write control signal according to the Input DE and the write permission signal, and generates a read control signal according to the Output DE. The buffer receives the image data from the source device according to the write control signal and the input pixel clock, and outputs the image data to the destination device according to the read control signal and the output pixel clock.

12 Claims, 7 Drawing Sheets

DEVICE AND METHOD FOR CONTROLLING FRAME INPUT AND OUTPUT

CROSS-REFERENCES TO RELATED APPLICATIONS

This non-provisional application claims priority under 35 U.S.C. §119(a) on Patent Application No. 98102941 filed in Taiwan, R.O.C. on 2009/1/23, the entire contents of which are hereby incorporated by reference.

BACKGROUND

1. Technical Field

The disclosure relates to a device and method for controlling a frame, and more particularly to a device and method for controlling frame input and output.

2. Related Art

A display is used for displaying a frame. However, sometimes, the display encounters a situation in which an input frame rate and a supported output frame rate are different. For example, in a personal computer system, a frame rate sent in a display through a display card may be different from a display update frequency of the display (usually set to 60 Hz). When frame rates of the input frame and the output frame are different, frame rate conversion (FRC) must be performed.

In a conventional FRC method, a buffer is usually used for storing frame data temporarily, and the buffer may be divided into one frame buffer area or two frame buffer areas. For one frame buffer area, since input and output of the same frame buffer area are implemented at the same time, a previous frame or a next frame may easily affect a current frame when a rate difference between frame input in the frame buffer area and frame output from the frame buffer area is too large, that is, a so-called frame tear problem may easily occur. Here, the frame tear means that an upper and a lower part of an actually displayed frame are data belonging to different frames.

The other method is to divide one buffer into two frame buffer areas, so as to alleviate the frame tear problem. In this manner the two frame buffer areas are alternately accessed at a low frame rate, and the other frame buffer area is selected to be accessed at a high frame rate according to one frame buffer area being accessed at the low frame rate, thereby preventing the current frame from being affected when input and output of either frame buffer area are implemented at the same time.

Although the method of two frame buffer areas can alleviate the frame tear problem, the limited space of the buffer means that the same buffer being divided into two frame buffer areas results in a size of a supportable input or output frame being much smaller than that supportable in the case of merely one frame buffer area. That is to say, for buffers having the same capacity, frame quality supportable in the method of merely one frame buffer area is higher than that in the method of two frame buffer areas. Similarly, in order to achieve the same supportable frame quality, a buffer having a larger capacity is needed for the method of two frame buffer areas, thus causing costs to rise.

SUMMARY

Accordingly, the disclosure is directed to a device and method for controlling frame input and output. The device and method of the disclosure enables the determination of whether a buffer can receive an input frame or not according to an input control parameter and an output control parameter. If an output frame is affected when the input frame is written in the buffer, the buffer is controlled not to receive the input frame, that is, to discard the input frame. Conversely, if the output frame is not affected when the input frame is written in the buffer, the buffer is permitted to receive the input frame. In this manner, the frame tear problem can effectively be alleviated.

The disclosure provides a device for controlling frame input and output, which is applied for the reception of an image data of a source device and output of the image data to a destination device. The image data includes a plurality of frames. The source device provides one or a plurality of input control signals to the device for controlling frame input and output. The one or plurality of input control signals includes an input data enable parameter (Input DE) and an input pixel clock. The destination device provides one or a plurality of output control signals to the device for controlling frame input and output. The one or plurality of output control signals includes an output data enable parameter (Output DE) and an output pixel clock. The device for controlling frame input and output includes a buffer, a buffer control circuit, and a frame write controller. The buffer receives the image data of the source device according to a write control signal and the input pixel clock and outputs the image data of the buffer to the destination device according to a read control signal and the output pixel clock. The input pixel clock is not equal to the output pixel clock. The buffer control circuit is coupled to the buffer, generates the write control signal according to the Input DE and a write permission signal, and generates the read control signal according to the Output DE. The frame write controller is coupled to the buffer control circuit and generates the write permission signal according to the Input DE and the Output DE. The write permission signal determines whether or not to permit the buffer control circuit to control the buffer so that the image data of the source device is received.

The disclosure also provides a method for controlling frame input and output which is applied for the reception of an image data of a source device and output of the image data to a destination device. The image data includes a plurality of frames. The source device provides one or a plurality of input control signals. The one or plurality of input control signals includes an Input DE and an input pixel clock. The destination device provides one or a plurality of output control signals. The one or plurality of output control signals includes an Output DE and an output pixel clock. The method includes the following steps. A write control signal is generated according to the Input DE and a write permission signal. A read control signal is generated according to the Output DE. The image data of the source device is written in a buffer according to the write control signal and the input pixel clock. The image data of the buffer is output to the destination device according to the read control signal and the output pixel clock. The input pixel clock is unequal to the output pixel clock. The write permission signal is generated according to the Input DE and the Output DE. The write permission signal determines whether or not to permit the write control signal to control the image data of the source device to be written in the buffer.

Preferred embodiments of the disclosure and efficacies thereof will be illustrated in detail below with the accompanying drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
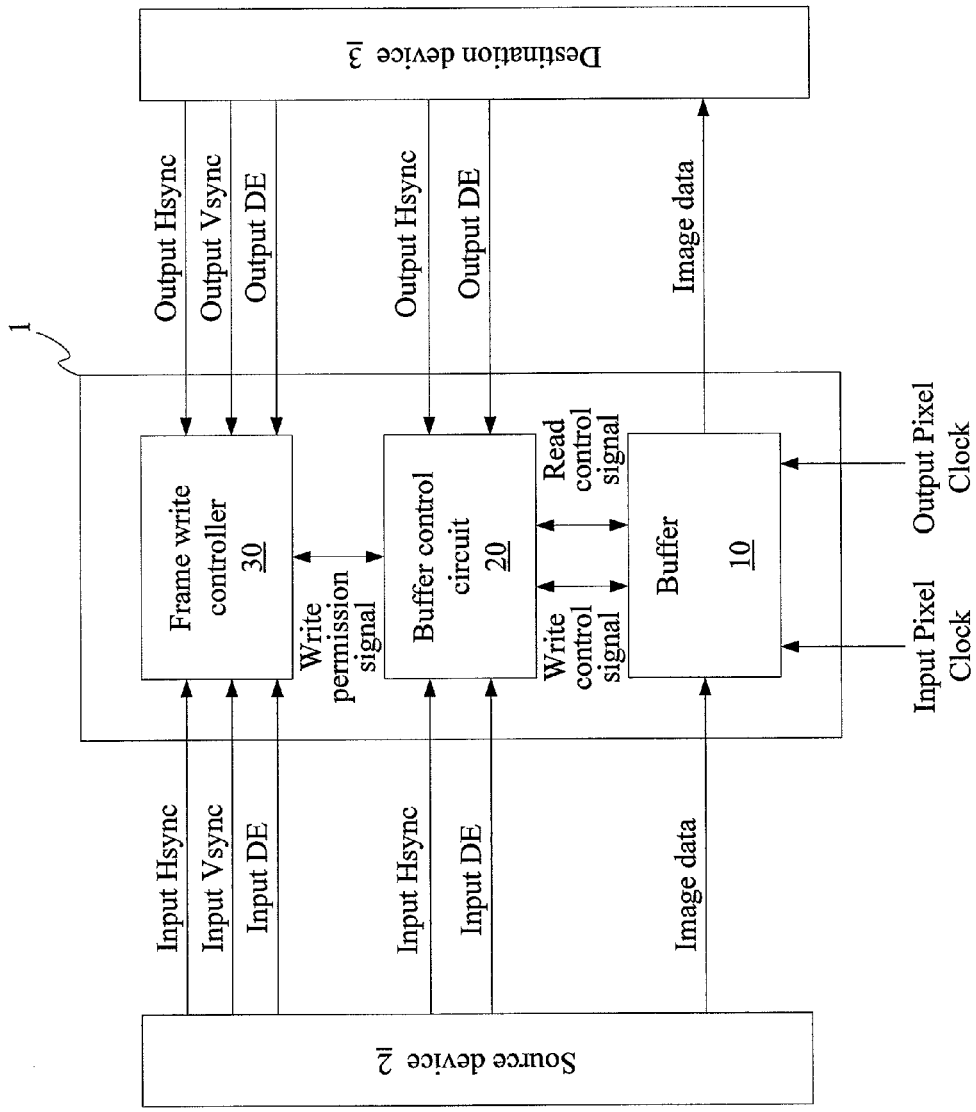
FIG. 1 is a block diagram of a device for controlling frame input and output according to a first embodiment.

FIG. 1 is a block diagram of a device for controlling frame input and output according to a first embodiment. The device for controlling frame input and output 1 of the embodiment includes a buffer 10, a buffer control circuit 20, and a frame write controller 30.

As shown in FIG. 1, the device for controlling frame input and output 1 receives image data from the source device 2 and outputs the image data to a destination device 3 for displaying. The image data includes a plurality of frames, which may also be fields. The source device 2 provides input control parameters (for example, at least one of an input vertical synchronization parameter (Input Vsync), an input horizontal synchronization parameter (Input Hsync), and an input data enabling parameter (Input DE)) and an input pixel clock to the device for controlling frame input and output 1. The source device 2 may provide the input control parameters directly to the device for controlling frame input and output 1. Alternatively, the source device 2 provides a signal carrying the input control parameters, and a control circuit (not shown in FIG. 1) generates the input control parameters according to the signal and then provides the input control parameters to the device for controlling frame input and output 1. As the implementation of the control circuit constitutes background knowledge of the relevant technical field, its description is omitted here. Furthermore, the destination device 3 provides output control parameters (for example, at least one of an output vertical synchronization parameter (Output Vsync), an output horizontal synchronization parameter (Output Hsync), and an output data enabling parameter (Output DE)) and an output pixel clock to the device for controlling frame input and output 1.

The frame write controller 30 coupled to the buffer control circuit 20 and generates a write permission signal according to the input and output control parameters from the source device 2 and the destination device 3, to control the buffer control circuit 20. The buffer control circuit 20 then generates a write control signal and a read control signal to control the buffer 10 according to the write permission signal and the input and output control parameters. Subsequently, the buffer 10 receives the image data of the source device 2 according to the write control signal and the input pixel clock, and outputs the image data to the destination device 3 for display according to the read control signal and the output pixel clock. In this embodiment, the input pixel clock and the output pixel clock are not equal. The buffer control circuit 20 and the buffer 10 formed an asynchronous buffer circuit, the operation of which according to the input and output control parameters of the source device 2 and the destination device 3 could be referred to in U.S. Pat. Nos. 5,951,635, 6,845,414, and 7,315,600.

Figure 2:
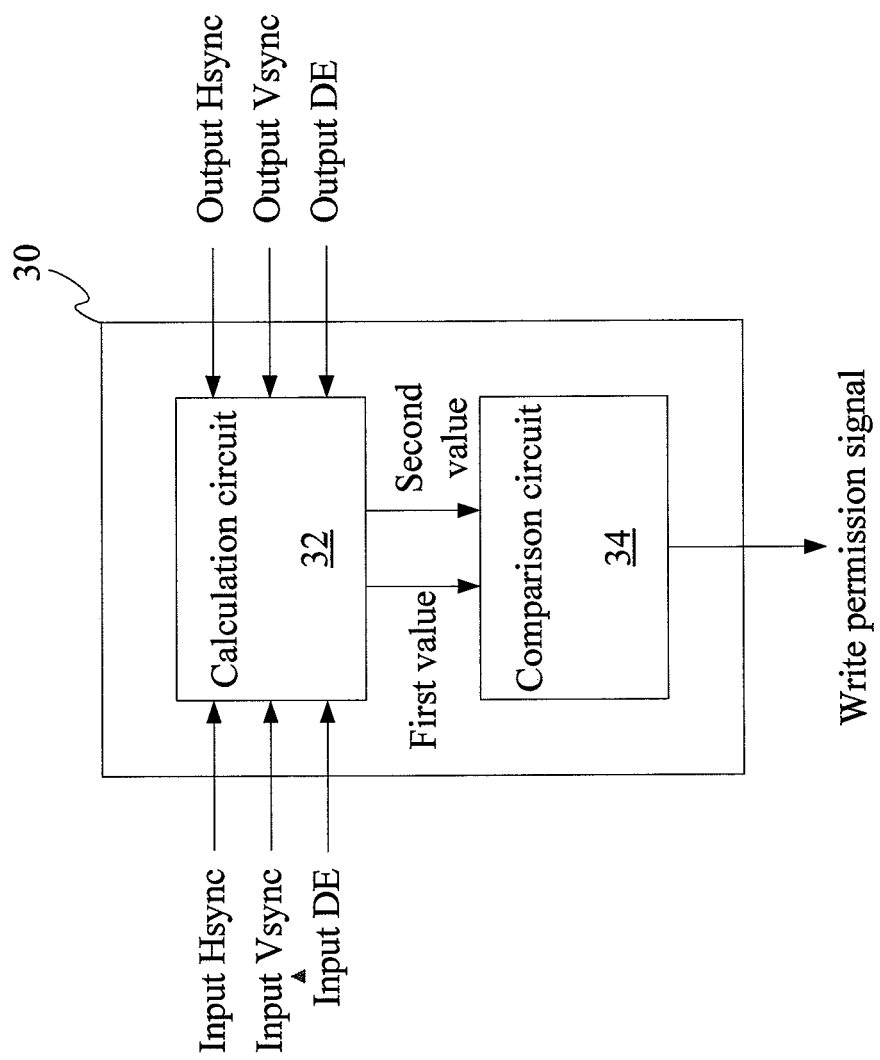
FIG. 2 is a block diagram of a frame write controller according to an embodiment.

FIG. 2 is a block diagram according to an embodiment of the frame write controller 30 in FIG. 1. The frame write controller 30 includes a calculation circuit 32 and a comparison circuit 34. In this embodiment, the calculation circuit 32 obtains a relation between a frame input rate and a frame output rate according to the input and output control parameters (for example, the frame input rate smaller than the frame output rate can be obtained according to Input Vsync period>Output Vsync period, wherein the Vsync could be replaced by parameters such as Hsync or pixel clock). When the frame input rate is smaller than the frame output rate, the calculation circuit 32 is operated in a first situation. When the frame input rate is greater than the frame output rate, the calculation circuit 32 is operated in a second situation. After the relation between the frame input rate and the frame output rate is determined, the calculation circuit 32 generates a first value according to the Input Hsync and the Input DE, and generates a second value according to the Output Hsync and the Output DE in the first or second situation respectively. The calculation of the first value keeps the same in the first and second situations, but the calculation of the second value differs in the first and second situation. Next, the comparison circuit 34 generates a write permission signal to determine whether to permit or forbid receiving the oncoming image data according to the first value and the second value. As to the frame input rate equal to the frame output rate, theoretically the frame tear will not occur, and the frame write controller 30 permits receiving the oncoming image data.

As described above, in the first situation, that is when the frame input rate is smaller than the frame output rate, if the comparison circuit 34 determines that the first value is smaller than the second value, a time point of completing input of visual data of a $k^{th}$ frame is earlier than a time point of completing output of the visual data of the $k^{th}$ frame, that is, the visual data of the $k^{th}$ frame is output after being completely written in the buffer 10, thus avoiding frame tear. In this case, the comparison circuit 34 generates a write permission signal to permit the buffer control circuit 20 to instruct the buffer 10 to receive the visual data of the $k^{th}$ frame. Conversely, if the comparison circuit 34 determines that the first value is not smaller than the second value, the time point of completing input of the visual data of the $k^{th}$ frame is equal to or later than the time point of completing output of the visual data of the $k^{th}$ frame, that is, a part of the visual data of the $k^{th}$ frame written in the buffer 10 may be completely output before the visual data of the $k^{th}$ frame is completely written in the buffer 10, and previously written visual data (for example, visual data of a $(k-1)^{th}$ frame), may subsequently be output, thus causing frame tear. In this case, the comparison circuit 34 generates a write permission signal to forbid the buffer control circuit 20 instructing the buffer 10 to receive the visual data of the $k^{th}$ frame.

In the second situation, that is, when the frame input rate is greater than the frame output rate, if the comparison circuit 34 determines that the first value is greater than the second value, the time point of completing input of the visual data of the $k^{th}$ frame is later than the time point of completely output of the previously written visual data (for example, the visual data of the $(k-1)^{th}$ frame), that is, the visual data of the $k^{th}$ frame is only completely written in the buffer 10 after the previously written visual data is completely output to the destination device 3, thus avoiding frame tear. In this case, the comparison circuit 34 generates a write permission signal to permit the buffer control circuit 20 to instruct the buffer 10 to receive the visual data of the $k^{th}$ frame. Conversely, if the comparison circuit 34 determines that the first value is not greater than the second value, the time point of completing input of the visual data of the $k^{th}$ frame is equal to or earlier than the time point of completing output of the previously written visual data (for example, the visual data of the $(k-1)^{th}$ frame), that is, before the previously written visual data is completely output to the destination device 3, the previously written visual data to be output may be overwritten by the visual data of the $k^{th}$ frame, thus causing frame tear. In this case, the comparison circuit 34 generates a write permission signal to forbid the buffer control circuit 20 instructing the buffer 10 to receive the visual data of the $k^{th}$ frame.

An embodiment of the calculation circuit 32 is given below. In order to make the illustration clear, the meaning conveyed by each related parameter is briefly introduced with reference to FIG. 3, followed by a description of how the calculation circuit 32 utilizes the related parameters to calculate the first value and the second value.

Figure 3:
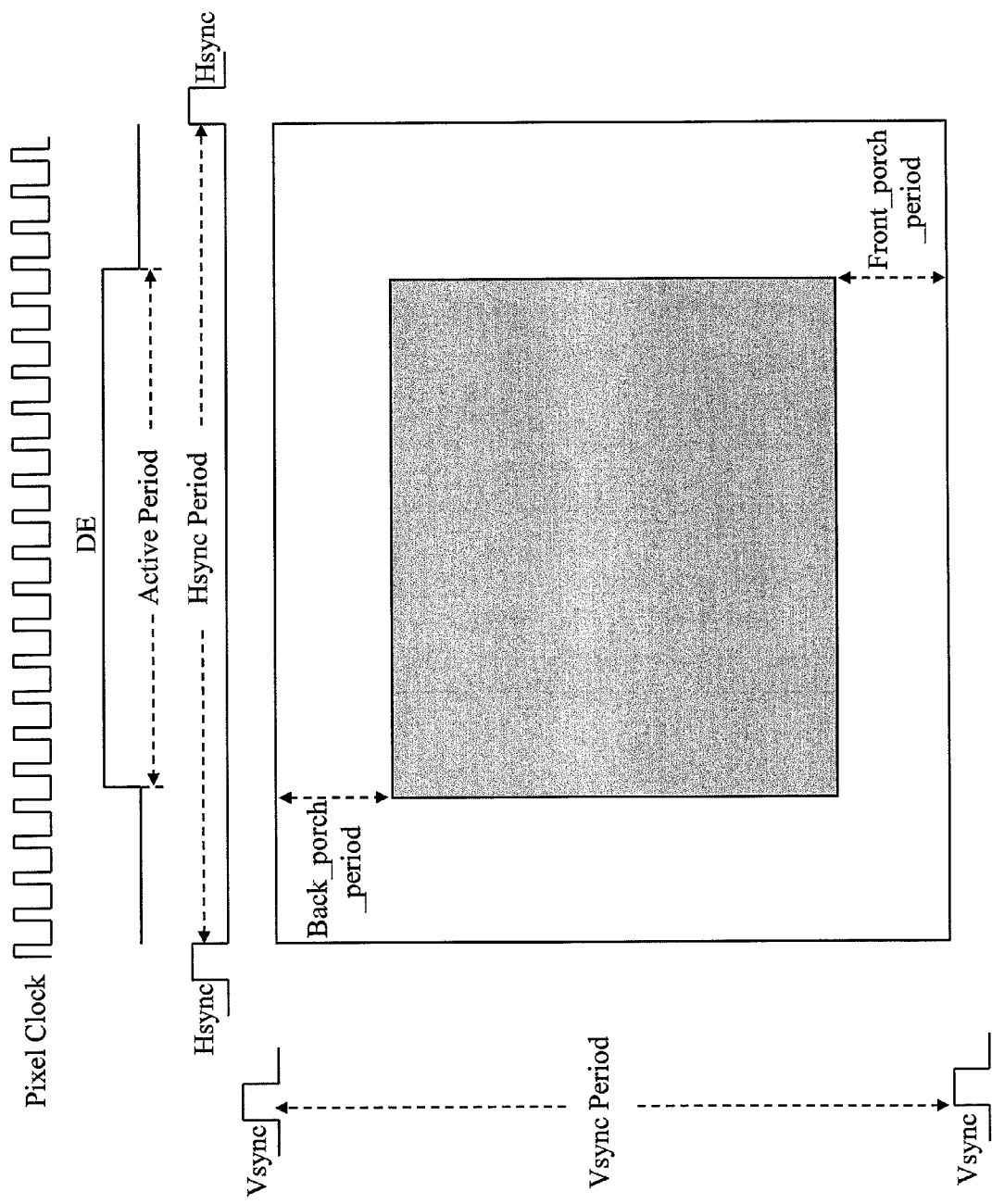
FIG. 3 is a schematic view of each frame in an image data.

FIG. 3 is a schematic view of each frame in the image data. Seen from FIG. 3, the meaning of each related parameter is introduced as follows:

1. Vertical synchronization signal (Vsync): representing start of each frame;
2. Vertical synchronization signal period (Vsync Period): representing a period of each frame;
3. Data enable signal (DE): representing that a currently input/output pixel is a valid pixel (that is, a pixel of a visual frame);
4. Back_porch_period: representing a period between appearance of the Vsync and pull-up of a first DE (that is, input/output of a first valid pixel is started);
5. Front_porch_period: representing a period between pull-down of a last DE (that is, input/output of a last valid pixel is completed) and appearance of the Vsync;
6. Porch Period: representing a sum of the Back_porch_period and the Front_porch_period;
7. Active Period: representing a period between the pull-up of the first DE (that is, the input/output of the first valid pixel is started), to the pull-down of the last DE (that is, the input/output of the last valid pixel is completed), that is, representing a period of input/output of the visual data in the frame. It should be noted that the Active Period of this definition includes a Porch Period of a horizontal scan line;
8. Horizontal synchronization signal (Hsync): representing start of each horizontal scan line;
9. Horizontal synchronization signal period (Hsync Period): representing a period of each horizontal scan line;
10. Total horizontal-scan-line number in one frame (H_total#): representing the number of all the horizontal scan lines in one frame;
11. Active-Period horizontal-scan-line number (Active H_line#): representing the number of horizontal scan lines in the Active Period;
12. Back_porch_period horizontal-scan-line number (Back_porch H_line#): representing the number of horizontal scan lines in the Back_porch_period; and
13. Pixel Clock: representing an input/output rate of each pixel.

It should be noted that the meanings and calculation of the related parameters are background knowledge of the technical field, for example, as shown in U.S. Pat. No. 6,894,706. Further, in the following, "Input" or "Output" in each parameter name is used to indicate whether the parameter is an input frame or an output frame.

Figure 4A:
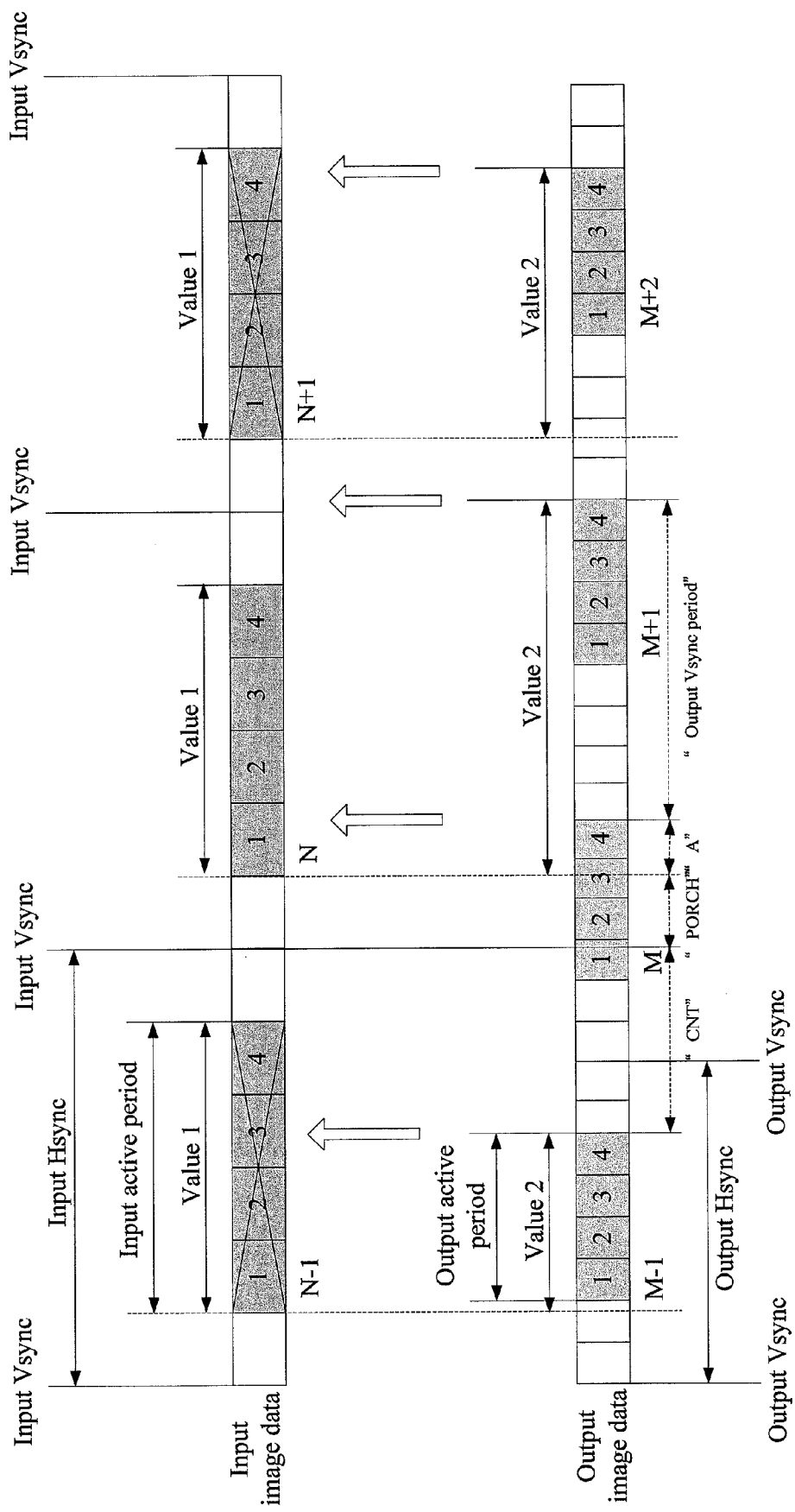
FIG. 4A is a first schematic view of frame input and output according to an embodiment.
Figure 4B:
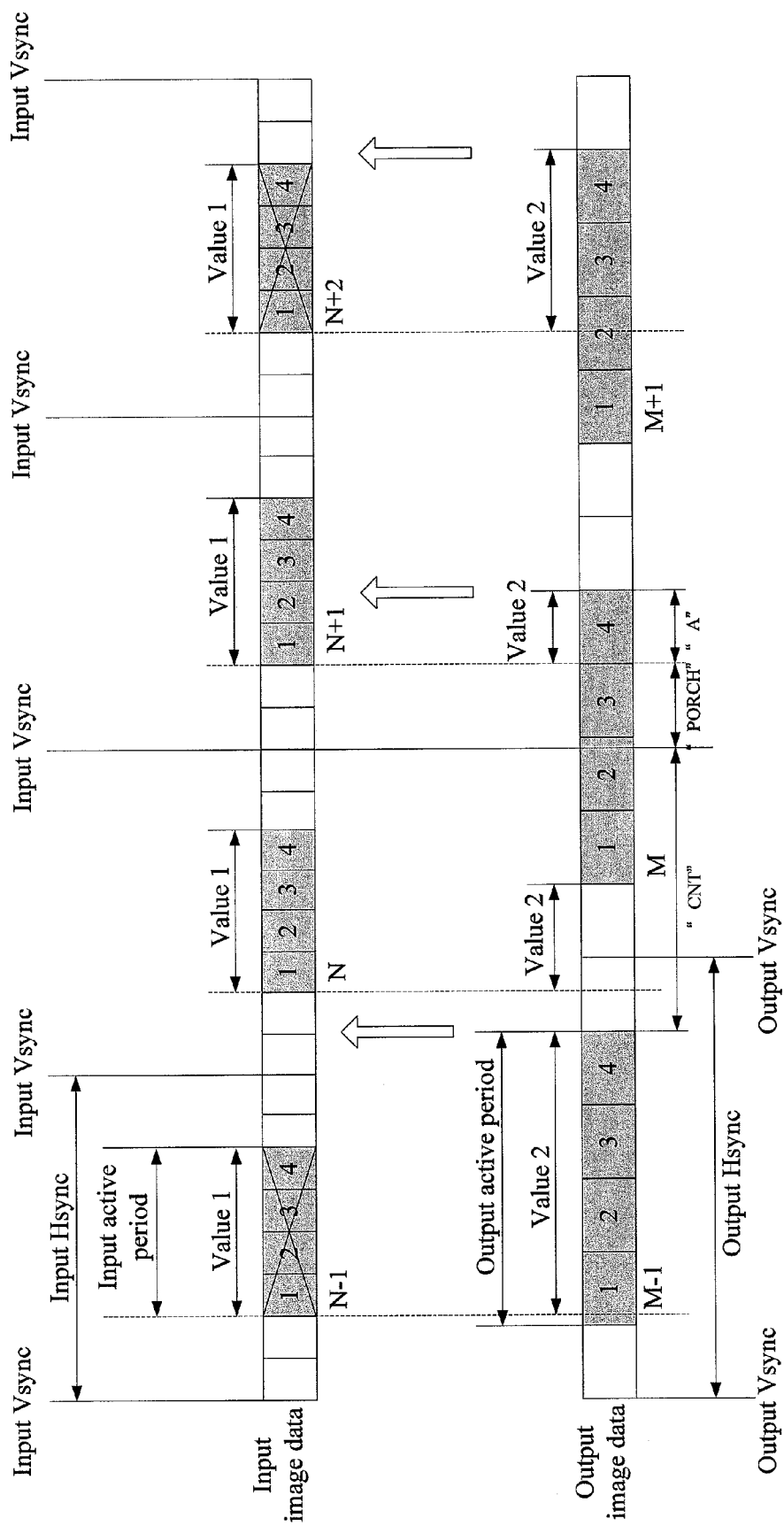
FIG. 4B is a second schematic view of frame input and output according to an embodiment.

After the meaning of each related parameter is introduced, FIGS. 4A and 4B are used to illustrate how the calculation circuit 32 calculates the first value Value 1 and the second value Value 2. FIGS. 4A and 4B show a relation between the input and output frames in a one-dimensional manner. Specifically, FIG. 4A shows a relation when the frame input rate is smaller than the frame output rate, and FIG. 4B shows a relation when the frame input rate is greater than the frame output rate. In FIGS. 4A and 4B, the Input Vsync defines a range of each frame in input image data, the Output Vsync defines a range of each frame in output image data, a gray frame part defines an active period, and a white frame part defines a porch period. FIG. 4A shows an embodiment according to this invention when (Output Vsync Period+output active period)>the Input Active Period.

Referring to FIG. 4A, when the calculation circuit 32 determines the frame input rate is smaller than the frame output rate according to the related parameters, the calculation circuit 32 obtains the first and second values in the following steps:

1. A first value Value 1 is calculated: Value 1=Input Active Period≈(Input Active H_line#)*(Input Hsync Period). Taking FIG. 4A as an example, if the Input Hsync Period is 1/50 ms, the first values Value 1 corresponding to each input frame are 4/50 ms.

2. A second value Value 2 is calculated:

(1) A Back_porch H_line# of an input frame is calculated: Back_porch H_line#=unconditional roundup {(Input Back_porch H_line#)*[(Input Hsync period)/(Output Hsync period)]}. Taking FIG. 4A as an example, if the Output Hsync period is 1/90 ms, the Back_porch H_line#=unconditional roundup {2*(90/50)}=4.

(2) A countdown value Cnt is obtained by using a countdown counter:

(a) A countdown start value of the countdown counter is Output Hsync_total#, which is valued as 8 by taking FIG. 4A as an example. Here, the ending of an output active period triggers resetting and starts countdown.

(b) The countdown value Cnt is obtained by triggering the Input Vsync. It should be noted that the counter is well known, and persons of ordinary skill in the art can implement a positive counter in a similar manner instead of the countdown counter in this embodiment.

(3) The second value Value 2 is calculated:

(a) If Cnt−Back_porch H_line#<Output Active H_line#, it represents that a current input image data is in the output active period. At this time, Value 2=(Cnt−Back_porch H_line#+Output H_total#)*(Output Hsync Period).

(b) If Cnt−Back_porch H_line#≧Output Active H_line#, it represents that the current input image data is not in the output active period. At this time, Value 2=(Cnt−Back_porch H_line#)*(Output Hsync Period). The above formula of the countdown counter is applied in FIG. 4B and will be illustrated below together with another embodiment (timer).

Referring to FIG. 4B, in another embodiment (timer) of the disclosure, the calculation circuit 32 obtains the first and second values in the following steps:

1. A first value Value 1 is calculated: Value 1=Input Active Period≈(Input Active H_line#)*(Input Hsync Period). Taking FIG. 4A as an example, if the Input Hsync Period is 1/50 ms, the first value Value 1 corresponding to each input frame is 4/50 ms.

2. A second value Value 2 is calculated:

(1) A Back_porch_period is calculated.

(2) A count time Cnt_time is obtained using a timer:

(a) A start value of the timer is 0, and the ending of an output active period triggers resetting and starts timing.

(b) The Cnt_time is obtained by triggering of the Input Vsync. It should be noted that, the timer is well known, and persons of ordinary skill in the art can implement with a reciprocal timer in a similar manner instead of the positive timer in this embodiment.

(3) The second value Value 2 is calculated:

(a) If Output Vsync period−Cnt_time−Back_porch_period<Output Active period, it represents that a current input image data is in the output active period. At this time, Value 2 =[(Output Vsync period−Cnt_time−Back_porch_period)+(Output Vsync period)].

Taking FIG. 4A as an example, before an $N^{th}$ frame is input, a second value Value 2 is calculated from a corresponding $M^{th}$ output frame. At first, the ending of an output active period of an $(M−1)^{th}$ output frame triggers resetting and starts timing, a Cnt_time is obtained by triggering of the Input Vsync, and the Cnt_time is noted as "CNT" in FIG. 4A. At this time, seen from FIG. 4A, the Back_porch_period is noted as "PORCH", and Output Vsync period−Cnt_time−Back_porch_period is noted as "A". Since "A" is smaller than the output active period, Value 2=[(Output Vsync period−Cnt_time−Back_porch_period)+(Output Vsync period)], that is, Value 2="A"+"Output Vsync period", as shown in FIG. 4A. Here it can be clearly seen that Value 2>Value 1 at this time, and a write permission signal permits the buffer control circuit 20 to instruct the buffer 10 to receive the $N^{th}$ input frame.

(b) If Output Vsync period−Cnt_time−Back_porch_period≧Output Active period, it represents that the current input image data is not in the output active period. At this time, Value 2=[(Output Vsync period)−Cnt_time−Back_porch_period].

Taking FIG. 4A as an example, before an $(N−1)^{th}$ frame and an $(N+1)^{th}$ frame are input, a second value Value 2 is calculated from corresponding $(M−1)^{th}$ and $(M+2)^{th}$ output frames respectively. The calculation method is the same as the above method, and the calculated second values are Value 2 as noted in the $(M−1)^{th}$ and $(M+2)^{th}$ output frames in FIG. 4A. Here it can be clearly seen that Value 2<Value 1 at this time, and a write permission signal forbids the buffer 10 to receive the $(N−1)^{th}$ and $(N+1)^{th}$ input frames, that is, to discard the $(N−1)^{th}$ and $(N+1)^{th}$ input frames.

Referring to FIG. 4B, when the calculation circuit 32 figures out the frame input rate is greater than the frame output rate according to the related parameters, the calculation circuit 32 obtains the first and second values in the following steps:

1. A first value Value 1 is calculated: Value 1=Input Active Period≈(Input Active H_line#)*(Input Hsync Period). Taking FIG. 4B as an example, if the Input Hsync Period is 1/90 ms, a first value Value 1 corresponding to each input frame is 4/90 ms.

2. A second value Value 2 is calculated:

(1) A Back_porch H_line# of an input frame is calculated: Back_porch H_line#=unconditional roundup {(Input Back_porch H_line#)*[(Input Hsync Period)/(Output Hsync Period)]}. Taking FIG. 4B as an example, if the Output Hsync Period is 1/50 ms, the Back_porch H_line#=unconditional roundup [1*(50/90)]=1.

(2) A countdown value Cnt is obtained by using a countdown counter:

(a) A countdown start value of the countdown counter is Output Hsync_total#, which is valued as 6 by taking FIG. 4B as an example. Here, the ending of an output active period triggers resetting and starts countdown.

(b) The countdown value Cnt is obtained by triggering of the Input Vsync. It should be noted that, the counter is well known, and persons of ordinary skill in the art can implement with a positive counter in a similar manner instead of the countdown counter in this embodiment.

(3) The second value Value 2 is calculated:

(a) If Cnt−Back_porch H_line#<Output Active Hline#, it represents that a current input image data is in the output active period. At this time, Value 2=(Cnt−Back_porch H_line#)*(Output Hsync Period).

(b) If Cnt−Back_porch H_line#≧Output Active H_line#, it represents the current input image data is not in the output active period. At this time, Value 2=[(Cnt−Back_porch H_line#)*(Output Hsync Period)−(Output Active Period)]. The above formula of the countdown counter is applied in FIG. 4B and will be illustrated below together with another embodiment (timer).

Referring to FIG. 4B, in another embodiment (timer), of the disclosure, the calculation circuit 32 obtains the first and second values through the following steps:

1. A first value Value 1 is calculated: Value 1=Input Active Period (Input Active H_line#)*(Input Hsync Period). Taking FIG. 4B as an example, if the Input Hsync Period is 1/90 ms the first value Value 1 corresponding to each input frame is 4/90 ms.

2. A second value Value 2 is calculated:

(1) A Back_porch_period is calculated.

(2) A count time Cnt_time is obtained by using a timer:

(a) A start value of the timer is 0, and the ending of an output active period triggers resetting and starts timing.

(b) The Cnt_time is obtained by triggering of the Input Vsync. It should be noted that the timer is well known, and persons of ordinary skill in the art can implement with a reciprocal timer in a similar manner instead of the positive timer in this embodiment.

(3) The second value Value 2 is calculated:

(a) If Output Vsync period−Cnt_time−Back_porch_period<Output Active period, it represents that a current input image data is in the output active period. At this time, Value 2 =[(Output Vsync period)−Cnt_time−Back_porch_period].

Taking FIG. 4B as an example, before an $(N+1)^{th}$ frame is input a second value Value 2 is calculated from a corresponding $M^{th}$ output frame. At first, the ending of an output active period of an $(M−1)^{th}$ output frame triggers resetting and starts timing, a Cnt_time is obtained by triggering of the Input Vsync, and the Cnt_time is note as "CNT" in FIG. 4B. At this time, seen from FIG. 4B, the Back_porch_period is noted as "PORCH", and Output Vsync period−Cnt_time−Back_porch_period is noted as "A". As "A" is smaller than the output active period, Value 2=[(Output Vsync period)−Cnt_time−Back_porch_period], that is, Value 2="A" as noted in FIG. 4B corresponding to the $(N+1)^{th}$ input frame. Here it can be clearly seen that Value 2<Value 1 at this time, and a write permission signal permits the buffer control circuit 20 to instruct the buffer 10 to receive the $(N+1)^{th}$ input frame.

(b) If Output Vsync period−Cnt_time−Back_porch_period≧Output Active period, it represents that the current input image data is not in the output active period. At this time, Value 2=[(Output Vsync period−Cnt_time−Back_porch_period)−(output active period)].

Taking FIG. 4B as an example, before an $N^{th}$ frame is input, a second value Value 2 is calculated. The calculation method is the same as the above method. At this time the Output Vsync period−Cnt_time−Back_porch_period is greater than the output active period. The output active period is therefore subtracted from the second value to obtain a value as Value 2 noted in the output image data corresponding to the $N^{th}$ input frame in FIG. 4B. Here it can be clearly seen that Value 2<Value 1 at this time, and a write permission signal permits the buffer control circuit 20 to instruct the buffer 10 to receive the $N^{th}$ input frame.

Correspondingly, for the $(N−1)^{th}$ and $(N+2)^{th}$ input frames, the obtained second value as noted in the $(M−1)^{th}$ and $(M+1)^{th}$ output frames in FIG. 4B. Here, it can be clearly seen that, Value 2>Value 1 at this time, and a write permission signal forbids the buffer 10 to receive the $(N-1)^{th}$ and $(N+2)^{th}$ input frames, that is, to discard the $(N-1)^{th}$ and $(N+2)^{th}$ the input frames.

It should be noted that, although in the above embodiment the Input Vsync serves as a trigger signal, the trigger signal may also be generated at a predetermined time to replace the Input Vysnc before the Input Active Period starts. Thereby, in the implementation of the embodiment, the Input Vsync may not be referred to. Moreover, it is well known to persons of ordinary skill in the art that, both the Vsync Period and the Active Period can be calculated according to data enable parameters. In addition, the above embodiment of calculating the second value Value 2 through a timer may be implemented without referring to the Hysnc. In view of the above, an embodiment of the frame write controller 30 of the embodiment can be implemented merely through the Input DE and Output DE. Another embodiment of the buffer control circuit 20 can be implemented without referring to the Input and Output Hsync. It is apparent to persons skilled in the art that the buffer control circuit 20 of the embodiment not only needs to determine in advance whether to generate a write control signal to control the buffer 10 to receive the image data according to the write permission signal of the frame write controller 30, but also implements processing unrelated to the write permission signal in a conventional manner.

Figure 5:
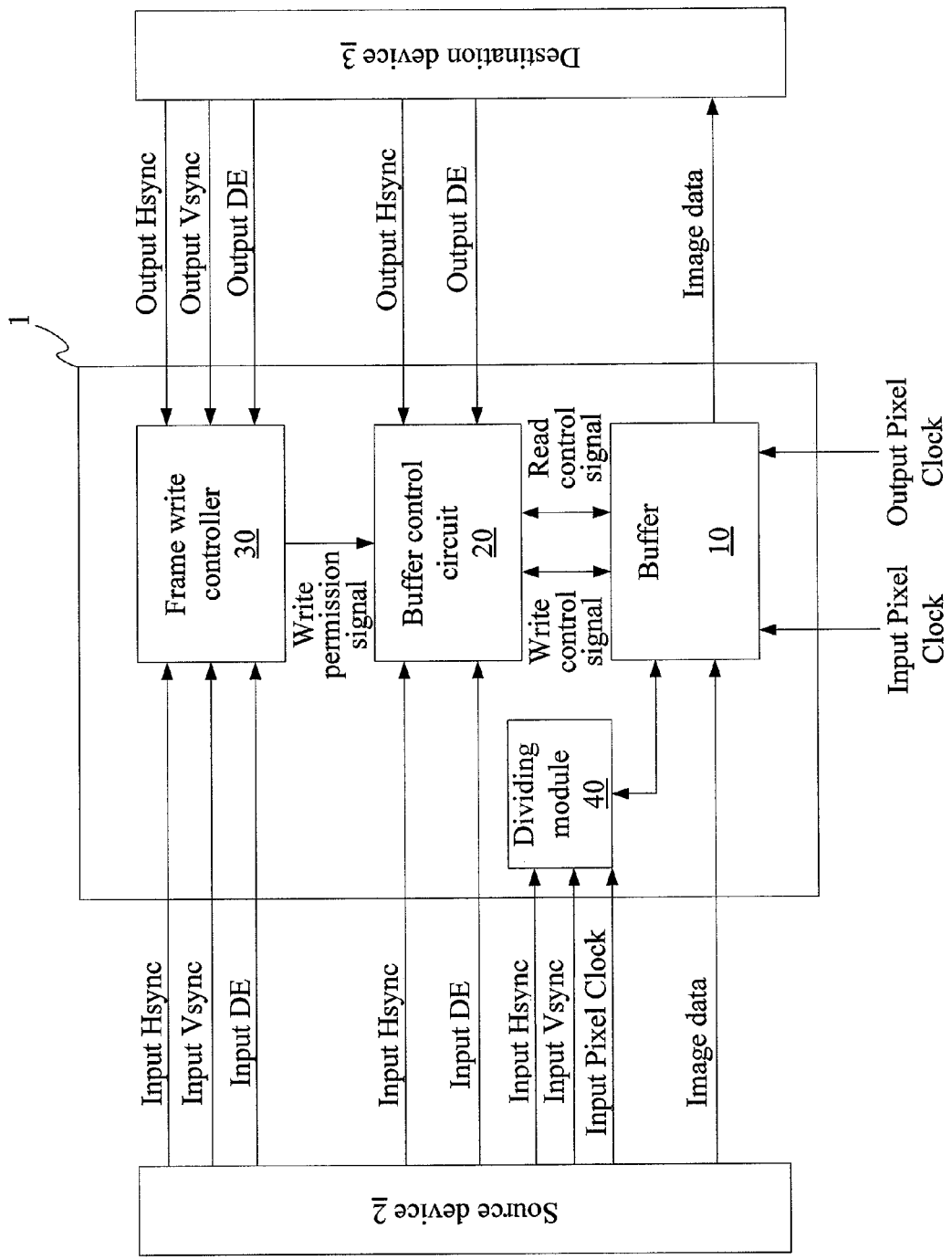
FIG. 5 is a block diagram of a device for controlling frame input and output according to a second embodiment.

FIG. 5 is a block diagram of a device for controlling frame input and output according to a second embodiment. A difference between this embodiment and the embodiment in FIG. 1 is that a dividing module 40 is further included. The dividing module 40 calculates a size of an input frame according to an input control parameter (such as, an Input Hsync, an Input Vsync, or an input pixel clock). Next, it is determined whether it is suitable to divide the buffer 10 into two or more frame buffer areas according to the size of the input frame and a storage capacity of the buffer 10. When the size of the input frame is 1/n (for example, ½) of the storage capacity of the buffer 10, the dividing module 40 is determined to divide the buffer 10 into n frame buffer areas (for example, two frame buffer areas), and each frame buffer area stores one input frame. In this manner, the space of the buffer 10 is fully utilized in the case that the size of the input frame is relatively small, and two or more frame buffer areas can be used to avoid the frame tear.

Figure 6:
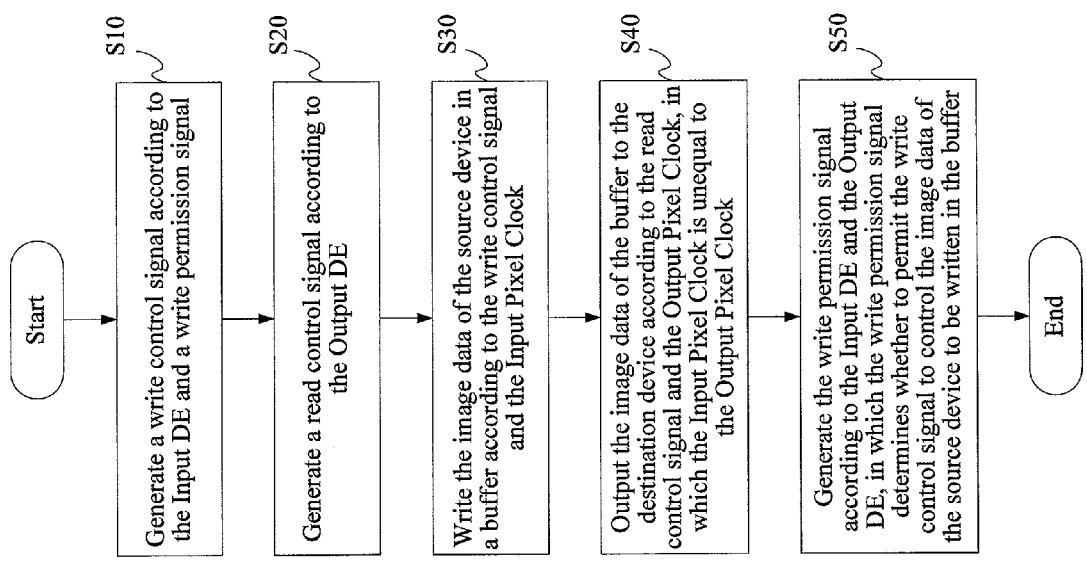
FIG. 6 is a flow chart of a method for controlling frame input and output.

FIG. 6 is a flow chart of a method for controlling frame input and output, which is applied for receiving image data of a source device and outputting the image data to a destination device. The image data includes a plurality of frames. The source device provides one or a plurality of input control signals. The one or plurality of input control signals includes an Input DE and an input pixel clock. The destination device provides one or a plurality of output control signals. The one or plurality of output control signals includes an Output DE and an output pixel clock. The method includes the following steps.

In Step S10, a write control signal is generated according to the Input DE and a write permission signal.

In Step S20, a read control signal is generated according to the Output DE.

In Step S30, the image data of the source device is written in a buffer according to the write control signal and the input pixel clock.

In Step S40, the image data of the buffer is output to the destination device according to the read control signal and the output pixel clock. The input pixel clock is unequal to the output pixel clock.

In Step S50, the write permission signal is generated according to the Input DE and the Output DE. The write permission signal determines whether to permit the write control signal to control the image data of the source device to be written in the buffer.

The step of generating the write permission signal includes generating a first value according to the Input DE. The first value represents a duration needed for completing input of visual data of a $k^{th}$ frame of the image data. A second value is generated according to the Output DE. The first value and the second value are compared to generate a comparison result. The write permission signal is generated according to the comparison result.

When the output pixel clock is greater than the input pixel clock, if the comparison result is that the first value is smaller than the second value, representing that a time point of completing input of the visual data of the $k^{th}$ frame is earlier than a time point of completing output of the visual data of the $k^{th}$ frame, the write permission signal permits the write control signal to control the visual data of the $k^{th}$ frame to be written in the buffer.

Similarly, when the output pixel clock is greater than the input pixel clock, if the comparison result is that the first value is greater than the second value, representing that the time point of completing input of the visual data of the $k^{th}$ frame is later than the time point of completing output of the visual data of the $k^{th}$ frame, the write permission signal does not permit the write control signal to control the visual data of the $k^{th}$ frame to be written in the buffer.

In another aspect, when the output pixel clock is smaller than the input pixel clock, if the comparison result is that the first value is greater than the second value, representing that the time point of completing input of the visual data of the $k^{th}$ frame is later than a time point of completing output of visual data of an $x^{th}$ frame of the image data, the write permission signal permits the write control signal to control the visual data of the $k^{th}$ frame to be written in the buffer, and the $x^{th}$ frame is earlier than the $k^{th}$ frame.

Similarly, when the output pixel clock is smaller than the input pixel clock, if the comparison result is that the first value is smaller than the second value, representing that the time point of completing input of the visual data of the $k^{th}$ frame is earlier than the time point of completing output of the visual data of the $x^{th}$ frame of the image data, the write permission signal does not permit the write control signal to control the visual data of the $k^{th}$ frame to be written in the buffer, and the $x^{th}$ frame is earlier than the $k^{th}$ frame.

Moreover, in order to effectively use the buffer space for receiving and outputting the image data, the method further includes the following step. The buffer is divided into a plurality of frame buffer areas according to a storage capacity of the buffer and a size of each of the frames in the image data. Each of the frame buffer areas is capable of storing one frame.

While the disclosure has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A device for controlling frame input and output, applied to the reception of an image data of a source device and output of the image data to a destination device, wherein the image data comprises a plurality of frames, the source device provides one or a plurality of input control signals to the device for controlling frame input and output, the one or plurality of input control signals comprises an input data enable parameter (Input DE) and an input pixel clock, the destination device provides one or a plurality of output control signals to the device for controlling frame input and output, and the one or plurality of output control signals comprises an output data enable parameter (Output DE) and an output pixel clock, the device for controlling frame input and output comprising:

a buffer, for receiving the image data of the source device according to a write control signal and the input pixel clock, and outputting the image data of the buffer to the destination device according to a read control signal and the output pixel clock, wherein the input pixel clock is unequal to the output pixel clock;

a buffer control circuit, coupled to the buffer, for generating the write control signal according to the Input DE and a write permission signal, and generating the read control signal according to the Output DE; and a frame write controller, coupled to the buffer control circuit, for generating the write permission signal according to the Input DE and the Output DE, wherein the write permission signal determines whether to permit the buffer control circuit to control the buffer to receive the image data of the source device, wherein the frame write controller comprises: a calculation circuit, for generating a first value according to the Input DE, wherein the first value represents duration needed for completing input of visual data of a $k^{th}$ frame of the image data, and the calculation circuit generates a second value according to the Output DE; and a comparison circuit, for comparing the first value and the second value to generate a comparison result, and generating the write permission signal according to the comparison result.

2. The device according to claim 1, wherein when the output pixel clock is greater than the input pixel clock, if the comparison result generated by the comparison circuit is that the first value is smaller than the second value, representing that a time point of completing input of the visual data of the $k^{th}$ frame is earlier than a time point of completing output of the visual data of the $k^{th}$ frame, the write permission signal permits the buffer control circuit to control the buffer to receive the visual data of the $k^{th}$ frame.

3. The device according to claim 1, wherein when the output pixel clock is greater than the input pixel clock, if the comparison result generated by the comparison circuit is that the first value is greater than the second value, representing that the time point of completing input of the visual data of the $k^{th}$ frame is later than the time point of completing output of the visual data of the $k^{th}$ frame, the write permission signal does not permit the buffer control circuit to control the buffer to receive the visual data of the $k^{th}$ frame.

4. The device according to claim 1, wherein when the output pixel clock is smaller than the input pixel clock, if the comparison result generated by the comparison circuit is that the first value is greater than the second value, representing that the time point of completing input of the visual data of the $k^{th}$ frame is later than a time point of completing output of visual data of an $x^{th}$ frame of the image data, the write permission signal permits the buffer control circuit to control the buffer to receive the visual data of the $k^{th}$ frame, and the $x^{th}$ frame is earlier than the $k^{th}$ frame.

5. The device according to claim 1, wherein when the output pixel clock is smaller than the input pixel clock, if the comparison result generated by the comparison circuit is that the first value is smaller than the second value, representing that the time point of completing input of the visual data of the $k^{th}$ frame is earlier than the time point of completing output of the visual data of the $X^{th}$ frame of the image data, the write permission signal does not permit the buffer control circuit to control the buffer to receive the visual data of the $k^{th}$ frame, and the $x^{th}$ frame is earlier than the $k^{th}$ frame.

6. The device according to claim 1, further comprising:
a dividing module, for dividing the buffer into a plurality of frame buffer areas according to a storage capacity of the buffer and a size of each of the frames in the image data, wherein each of the frame buffer areas is capable of storing one frame.

7. A method for controlling frame input and output, applied for receiving an image data of a source device and outputting the image data to a destination device, wherein the image data comprises a plurality of frames, the source device provides one or a plurality of input control signals, the one or plurality of input control signals comprises an input data enable parameter (Input DE) and an input pixel clock, the destination device provides one or a plurality of output control signals, the one or plurality of output control signals comprises an output data enable parameter (Output DE) and an output pixel clock, the method comprising:

generating a write control signal according to the Input DE and a write permission signal;

generating a read control signal according to the Output DE;

writing the image data of the source device in a buffer according to the write control signal and the input pixel clock;

outputting the image data of the buffer to the destination device according to the read control signal and the output pixel clock, wherein the input pixel clock is unequal to the output pixel clock; and generating the write permission signal according to the Input DE and the Output DE, wherein the write permission signal determines whether to permit the write control signal to control the image data of the source device to be written in the buffer, wherein the step of generating the write permission signal comprises: generating a first value according to the Input DE, wherein the first value represents a duration needed for completing input of visual data of a $k^{th}$ frame of the image data; generating a second value according to the Output DE; comparing the first value and the second value to generate a comparison result; and generating the write permission signal according to the comparison result.

8. The method according to claim 7, wherein when the output pixel clock is greater than the input pixel clock, if the comparison result is that the first value is smaller than the second value, representing that a time point of completing input of the visual data of the $k^{th}$ frame is earlier than a time point of completing output of the visual data of the $k^{th}$ frame, the write permission signal permits the write control signal to control the visual data of the $k^{th}$ frame to be written in the buffer.

9. The method according to claim 7, wherein when the output pixel clock is greater than the input pixel clock, if the comparison result is that the first value is greater than the second value, representing that the time point of completing input of the visual data of the $k^{th}$ frame is later than the time point of completing output of the visual data of the $k^{th}$ frame, the write permission signal does not permit the write control signal to control the visual data of the $k^{th}$ frame to be written in the buffer.

10. The method according to claim 7, wherein when the output pixel clock is smaller than the input pixel clock, if the comparison result is that the first value is greater than the second value, representing that the time point of completing input of the visual data of the $k^{th}$ frame is later than a time point of completing output of visual data of an $x^{th}$ frame of the image data, the write permission signal permits the write control signal to control the visual data of the $k^{th}$ frame to be written in the buffer, and the $x^{th}$ frame is earlier than the $k^{th}$ frame.

11. The method according to claim 7, wherein when the output pixel clock is smaller than the input pixel clock, if the comparison result is that the first value is smaller than the second value, representing that the time point of completing input of the visual data of the $k^{th}$ frame is earlier than the time point of completing output of the visual data of the $x^{th}$ frame of the image data, the write permission signal does not permit the write control signal to control the visual data of the $k^{th}$ frame to be written in the buffer, and the $x^{th}$ frame is earlier than the $k^{th}$ frame.

12. The method according to claim 7, further comprising:
dividing the buffer into a plurality of frame buffer areas according to a storage capacity of the buffer and a size of each of the frames in the image data, wherein each of the frame buffer areas is capable of storing one frame.

\* \* \* \* \*